United States Patent
Demaj et al.

(10) Patent No.: US 12,437,180 B2
(45) Date of Patent: Oct. 7, 2025

(54) SYSTEM AND METHOD FOR MODIFYING INTEGER AND FRACTIONAL PORTION SIZES OF A PARAMETER OF A NEURAL NETWORK

(71) Applicant: STMicroelectronics (Rousset) SAS, Rousset (FR)

(72) Inventors: Pierre Demaj, Nice (FR); Laurent Folliot, Gourdon (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 857 days.

(21) Appl. No.: 16/810,582

(22) Filed: Mar. 5, 2020

(65) Prior Publication Data

US 2020/0302266 A1    Sep. 24, 2020

(30) Foreign Application Priority Data

Mar. 20, 2019 (FR) .................................. 1902853

(51) Int. Cl.
    *G06N 3/04* (2023.01)
    *G06N 3/08* (2023.01)
(52) U.S. Cl.
    CPC .................. *G06N 3/04* (2013.01); *G06N 3/08* (2013.01)
(58) Field of Classification Search
    CPC ............ G06N 3/04; G06N 3/08; G06N 3/045; G06N 3/084; G06N 3/063
    See application file for complete search history.

(56) References Cited

U.S. PATENT DOCUMENTS 11,429,862 B2 *  8/2022  Chai ..................... G06N 3/044
11,461,614 B2 * 10/2022  Baum .................. G06F 12/0646
(Continued)

FOREIGN PATENT DOCUMENTS

CN       106796668 A    5/2017
CN       108205699 A    6/2018
(Continued)

OTHER PUBLICATIONS

Gupta, S. et al., "Deep Learning with Limited Numerical Precision", https://proceedings.mlr.press/v37/gupta15 (Year: 2015).*
(Continued)

*Primary Examiner* — Alexey Shmatov
*Assistant Examiner* — Devika S Maharaj
(74) *Attorney, Agent, or Firm* — Slater Matsil, LLP (57) ABSTRACT

In accordance with an embodiment, a method includes reducing a size of at least one initial parameter of each layer of an initial multilayer neural network to obtain for each layer a set of new parameters defining a new neural network, wherein each new parameter of the set of new parameters has its data represented in two portions comprising an integer portion and a fractional portion; implementing the new neural network using a test input data set applied only once to each layer; determining a distribution function or a density function resulting from the set of new parameters for each layer; and based on the determined distribution function or density function, adjusting a size of a memory area allocated to the fractional portion and a size of the memory area allocated to the integer portion of each new parameter associated with each layer.

21 Claims, 5 Drawing Sheets

(56) References Cited

U.S. PATENT DOCUMENTS

| | | | |
|---|---|---|---|
| 2016/0328645 A1* | 11/2016 | Lin | G06N 3/08 |
| 2016/0328646 A1* | 11/2016 | Lin | G06N 3/084 |
| 2016/0328647 A1 | 11/2016 | Lin et al. | |
| 2017/0220929 A1* | 8/2017 | Rozen | G06F 7/483 |
| 2018/0032866 A1 | 2/2018 | Son et al. | |
| 2018/0032867 A1 | 2/2018 | Son et al. | |
| 2018/0107451 A1* | 4/2018 | Harrer | G06N 3/063 |
| 2019/0042948 A1* | 2/2019 | Lee | G06N 3/063 |
| 2019/0171927 A1 | 6/2019 | Diril et al. | |
| 2019/0236437 A1* | 8/2019 | Shin | G06N 3/08 |
| 2020/0026986 A1* | 1/2020 | Ha | G06N 3/045 |
| 2020/0104715 A1 | 4/2020 | Denolf et al. | |
| 2020/0134461 A1* | 4/2020 | Chai | G06N 3/084 |
| 2020/0159533 A1* | 5/2020 | Zhang | G06F 9/30036 |
| 2022/0327366 A1* | 10/2022 | Imber | G06N 3/084 |

FOREIGN PATENT DOCUMENTS

| | | |
|---|---|---|
| CN | 108345939 A | 7/2018 |
| CN | 108960411 A | 12/2018 |
| EP | 3276540 A2 | 1/2018 |

OTHER PUBLICATIONS

Koster, U. et al., "Flexpoint: An Adaptive Numerical Format for Efficient Training of Deep Neural Networks", https://arxiv.org/abs/1711.02213 (Year: 2017).*

Park, S. et al., "Quantized Memory-Augmented Neural Networks", https://arxiv.org/abs/1711.03712 (Year: 2018).*

Nicholls, J., "Quantization in Deep Learning", https://medium.com/@joel_34050/quantization-in-deep-learning-478417eab72b (Year: 2018).*

Shah, M. et al., "A Fixed-Point Neural Network Architecture for Speech Applications on Resource Constrained Hardware", https://link.springer.com/article/10.1007/s11265-016-1202-x (Year: 2018).*

Gupta, S. et al., "Deep Learning with Limited Numerical Precision", https://proceedings.mlr.press/v37/gupta15.html (Year: 2015).*

Judd, P. et al., "Reduced-Precision Strategies for Bounded Memory in Deep Neural Nets", https://arxiv.org/abs/1511.05236 (Year: 2016).*

De Bruin, Barry, et al., "Quantization of constrained processor data paths applied to Convolutional Neural Networks", 2018 21st Euromicro Conference on Digital System Design, Aug. 29-31, 2018, Prague, Czech Republic, pp. 357-364.

Gysel, Philipp Matthias et al., "Ristretto: Hardware-Oriented Approximation of Convolutional Neural Networks", Thesis, aXiv:1605.06402V1 [cs.CV] May 20, 2016, 73 pages.

Lin, Darryl D., et al., "Fixed Point Quantization of Deep Convolutional Networks", Conference Paper at ICLR, QualComm Research, arXiv:1511.06393v2 [cs.LG], Jan. 7, 2016, 15 pages.

Wrobel, Krzysztof et al., "Convolutional neural network compression for natural language processing", arXiv:1805.10796v1 [cs.CL], May 28, 2018, 7 pages.

Carreira-Perpinan, Miguel A., "Model compression as constrained optimization, with application to neural nets—Part I: General framework", arXiv preprint arXiv:1707.01209, 23 pages, Jul. 2017.

Trujillo-Romero, Felipe "Generation of neural networks using a genetic algorithm approach", International Journal of Bio-Inspired Computation 5.5, pp. 289-302, Oct. 2013.

Chen, X. et al., "FxpNet: Training a Deep Convolution Neural Network in Fixed-Point Representation," 2017 International Joint Conference on Neural Networks, 2017, 8 pages.

Drumond, M. et al., "Training DNN's with Hybrid Block Floating Point," Advances in Neural Information Processing Systems 31, 2018, 11 pages.

Zhou, Y et al., "Adaptive Quantization for Deep Neural Network," The Thirty-Second AAA1 Conference on Artificial Intelligence (AAA1-18), 2018, 9 pages.

Han, Song et al., "A Deep Neural Network Compression Pipeline: Pruning, Quantization, Huffman Encoding", XP055378073, Iclr, Feb. 2, 2016, 14 pages.

Kristiansen, Gus et al., "EnergyNet: Energy-based Adaptive Structural Learning of Artificial Neural Network Architectures," arXiv preprint arXiv:1711.03130, Nov. 8, 2017, 7 pages.

\* cited by examiner

SYSTEM AND METHOD FOR MODIFYING INTEGER AND FRACTIONAL PORTION SIZES OF A PARAMETER OF A NEURAL NETWORK

This application claims priority to French Patent Application No. 1902853, filed on Mar. 20, 2019, which application is hereby incorporated herein by reference in its entirety.

TECHNICAL FIELD

Implementations and embodiments of the invention relate to neural networks, more particularly deep and notably deep learning neural networks.

BACKGROUND

Neural networks are widely used for solving various statistical problems notably the problem of classifying data. After an automatic learning phase, generally supervised, i.e. on an already classified reference database, a neural network "learns" and becomes capable by itself of applying the same classification to unknown data.

Convolutional neural networks (CNN) represent a type of neural network in which the connection pattern between the neurons is inspired by the visual cortex of animals. They allow the effective recognition of objects or persons in images or videos.

The architecture of a neural network generally comprises a succession of layers each of which takes its inputs from the outputs of the preceding layer. The output data ("features") are stored in memory areas having a predefined size. The input data are multiplied by at least one weight of a given value for each layer.

"Weight," which is a term the meaning of which in the field of neural networks is well known to the person skilled in the art, is understood to refer to configurable neural parameters for obtaining good output data. This weight is determined by training the neural network on a training database. More precisely, the neural network processes, for example, an image extracted from said database and at the output it makes a prediction, i.e. to which class the image could belong, given that the class of the image is previously known.

Depending on the veracity of this result, all the weights of the neural network are updated according to an algorithm known as gradient backpropagation.

Generally, the output data and the weights of each layer are represented in floating point e.g., over 32 bits, which makes it possible to have a neural network with better performance with regard to predictions. The output data and the weights of each layer may also be represented in fixed point, e.g. over 16 or 8 bits. "Floating point" is understood to mean a representation of a number by a sign, a mantissa and an exponent. "Fixed point" is understood to mean a representation of a number with a fixed number of decimal places. A fixed-point representation comprises an integer portion, i.e. the bits to the left of the decimal point, and a fractional portion corresponding to the number of bits to the right of the decimal point.

The memory areas allocated for fixed-point representations are generally smaller than those allocated for floating-point representations. This memory reduction allows the system implementing the neural network to be faster. Indeed, said system is generally optimized for representations in 8 or 16 bits, which corresponds to fixed-point representations. However, this gain in speed often leads to information losses given that the allocated memory areas are reduced.

In a fixed-point representation, e.g. 8 bits including the sign bit, reducing the size of the memory area allocated to the integer portion, e.g. 3 bits, for increasing the size of the memory area allocated to the fractional portion, e.g. 4 bits, may lead to a risk of saturation for large numbers, and reducing the size of the memory area allocated to the fractional portion, e.g. 3 bits, for increasing the size of the memory area allocated to the integer portion, e.g. 4 bits, may lead to a loss of precision for small numbers.

There is therefore a need to find a good compromise, as far as possible, between the risks of saturation and loss of precision.

One approach consists in testing all the possible representations of the output data and weights over 8 bits and doing so for each layer. This involves implementing a test data set 8 to 16 times for each layer. However, layer by layer processing is very tedious and slow.

There is therefore a need to introduce a solution for finding the right compromise and doing so in a shorter time.

SUMMARY

In accordance with an embodiment, A method includes analyzing a set of initial parameters defining an initial multilayer neural network, analyzing comprising reducing a size of at least one initial parameter of each layer of the initial multilayer neural network to obtain for each layer a set of new parameters defining a new neural network, wherein each new parameter of the set of new parameters has its data represented in two portions comprising an integer portion and a fractional portion; implementing the new neural network using a test input data set applied only once to each layer; determining a distribution function or a density function resulting from the set of new parameters for each layer; and based on the determined distribution function or density function, either increasing a size of a memory area allocated to the fractional portion and a reducing a size of the memory area allocated to the integer portion of each new parameter associated with each layer, or reducing the size of the memory area allocated to the fractional portion and increasing the size of the memory area allocated to the integer portion of each new parameter associated with each layer.

In accordance with another embodiment, a system includes a processor coupled to a memory array, the processor configured to analyze a set of initial parameters defining an initial multilayer neural network by reducing a size of at least one initial parameter of each layer of the initial multilayer neural network to obtain for each layer a set of new parameters defining a new neural network, wherein each new parameter of the set of new parameters has its data represented in two portions comprising an integer portion and a fractional portion; implement the new neural network using a test input data set applied only once to each layer; determine a distribution function or a density function resulting from the set of new parameters for each layer; and based on the determined distribution function or density function, either increase a size of a memory area of the memory array allocated to the fractional portion and reduce a size of a memory area allocated to the integer portion of each new parameter associated with each layer, or reduce the size of a memory area of the memory array allocated to the fractional portion and increase the size of the memory area allocated to the integer portion of each new parameter associated with each layer.

In accordance with a further embodiment, a method includes reducing a size of a parameter of a neural network to produce a reduced size parameter, wherein the reduced size parameter comprises a integer portion and a fixed point portion; executing the neural network one time per layer using the reduced size parameter to produce a set of result parameters; determine a distribution or density function of the result parameters; determine a risk of saturation or loss of precision based on the determined distribution or density function; and adjusting a size of the integer portion and the fixed point portion of the reduced size parameter based on the determined risk of saturation or loss of precision

BRIEF DESCRIPTION OF THE DRAWINGS

Other advantages and features of the invention will appear on reading the detailed description of implementations and embodiments, in no way restrictive, and the appended drawings in which.

DETAILED DESCRIPTION OF ILLUSTRATIVE EMBODIMENTS

According to one aspect, a method is provided comprising an analysis of a set of initial parameters defining an initial multilayer neural network. Said analysis comprises a reduction in the size of at least one initial parameter of each layer so as to obtain for each layer a set of new parameters defining a new neural network. Each new parameter has its data represented in two portions, an integer portion and a fractional portion. Said analysis also comprises an implementation of said new neural network using a test input data set applied only once to each layer. Said analysis also comprises a development for each layer of a distribution function or a density function resulting from the interaction of the set of said new parameters. Said analysis also comprises a use of the distribution function or the density function for deciding: either an increase in the size of the memory area allocated to the fractional portion and a reduction in the size of the memory area allocated to the integer portion, or a reduction in the size of the memory area allocated to the fractional portion and an increase in the size of the memory area allocated to the integer portion of each new parameter associated with said layer.

In various embodiments, the term "Initial parameter" may be understood to mean a parameter relating to the configuration of the neural network, e.g. the weights of each layer and the size of the memory area to be allocated for the output data of each layer. Each parameter may have a defined memory size, a set of new parameters is a set where the memory size of at least one initial parameter or some or all of them has been modified e.g. by reducing said memory size.

The reduction in memory size advantageously comprises a transition from parameters represented in floating point to a fixed-point representation. This accordingly involves an adjustment of the number of bits of the fractional portion and of the integer portion of at least one initial parameter or some or all of them. For adjusting the size relating to the fractional portion and to the integer portion, a test input data set is placed at the input of the new neural network i.e. with a new set of parameters. This data set is used to assess the performance of the neural network. In some embodiments, this data set is executed only once per layer. This makes it possible to increase the speed of processing of the neural network.

This implementation makes it possible to deliver an output data matrix from the layer that subsequently allows a distribution or density function to be developed.

The data relating to the weights of the layer may also be retrieved.

Said density or distribution function makes it possible to determine how the adjustment should be done with respect to the size of the memory area allocated to the integer portion and the size of the memory area allocated to the fractional portion for finding a good compromise between the risks of saturation and loss of precision.

According to one implementation, said test input data set comprises a plurality of data vectors, and for each layer successively delivers vectors one by one or by successive group of vectors and a result is generated representative of the new parameters associated with said layer.

When the neural network is executed in a graphics processor or GPU (Graphics Processing Unit), it is advantageous to deliver for each layer a successive group of vectors to take advantage of the parallelism of said processor.

According to one implementation, the development of the distribution function or the density function comprises the calculation of a probability density of the values of the new parameters associated with each layer, obtained by the implementation of said new network for each layer.

Each vector or group of vectors delivered makes it possible to obtain new output values corresponding to the new parameters.

It is advantageous to calculate a probability density of these new values for said layer.

According to one implementation, the development of the distribution function or the density function for each layer comprises a distribution over N values of the discretized possible values of the new parameters delivered by the layer, a calculation of the probability density of each value among the N values, and a storage of each calculated probability density associated with each of the N values.

In order not to slow down said calculations and the development of the density or distribution function, it is desirable to store N possible values, e.g. 32 values.

According to one implementation, the N values are in the form of a power of 2.

Placing in the form of a power of 2 is advantageous for performing arithmetic operations of the two's complement type known to the person skilled in the art.

According to one implementation, the use of the distribution function or the density function comprises a first selection of a first value corresponding to the maximum value of the N distributed values and a second selection of a second value corresponding to one of the N distributed values associated with a first threshold value, a calculation of the difference between the first value and the second value and a comparison of the difference with a second threshold value.

For example, the first threshold value is 0.2, which means that for choosing the value N associated with said first threshold value, the ideal is being positioned on the abscissa axis corresponding to the value N from which the distribution or density function has its cumulative concentration greater than or equal to 80%.

Generally, it is positioned between two values N of the abscissa axis. It is desirable, in this case, for having a precise value, to perform a linear interpolation.

The comparison with the second threshold value makes it possible to determine a good compromise to be made between the fractional portion and the integer portion.

The second threshold value may be, for example, between 1 and 5.

According to one implementation, if the difference is less than or equal to the second threshold value, the size of the memory area allocated to the integer portion is increased and the size of the memory area allocated to the fractional portion is reduced and if the difference is strictly greater than the second threshold value, the size of the memory area allocated to the fractional portion is increased and the size of the memory area allocated to the integer portion is reduced.

If the difference is less than or equal to the second threshold value, this means that there is a high risk of saturation in the layer. Accordingly, it is advantageous to adjust the distribution of the bits of the integer and fractional portion by increasing the size of the memory area allocated to the integer portion and by reducing the size of the memory area allocated to the fractional portion.

If the difference is strictly greater than the second threshold value, this means that there is no great risk of saturation but a risk of loss of precision. It is therefore preferable to adjust the distribution of the bits of the integer and fractional portion by reducing the size of the memory area allocated to the integer portion and increasing the size of the memory area allocated to the fractional portion.

According to another aspect, a system is also provided comprising a computing unit, e.g. a processor, coupled to a memory array, the computing unit comprising analysis means configured for performing an analysis of a set of initial parameters defining an initial multilayer neural network.

In an embodiment, the analysis means may be configured for reducing the size of at least one initial parameter of each layer so as to obtain for each layer a set of new parameters defining a new neural network, each new parameter having its data represented in two portions, an integer portion and a fractional portion, implementing the new neural network by using a test input dataset applied only once to each layer, developing for each layer a distribution function or a density function resulting from the set of said new parameters and using the distribution function or density function to decide whether to increase the size of the memory area allocated to the fractional portion and to reduce the size of the memory area allocated to the integer portion or to reduce the size of the memory area allocated to the fractional portion and to increase the size of the memory area allocated to the integer portion of each new parameter associated with said layer.

According to one embodiment, said test input data set comprises a plurality of data vectors, and the analysis means are configured for successively delivering vectors for each layer one by one or by successive group of vectors, and a result is generated representative of the new parameters associated with said layer.

According to one embodiment, for developing the distribution function or the density function, the analysis means are configured for calculating a probability density of vectors of the new parameters associated with each layer, obtained by the implementation of said new network for each layer.

According to one embodiment, for developing the distribution function or the density function for each layer, the analysis means are configured for distributing over N values the possible discretized values of the new parameters delivered by the layer, calculating the probability density of each value among the N values and storing each calculated probability density associated with each of the N values.

According to one embodiment, the N values are in the form of a power of 2.

According to one embodiment, the analysis means are configured for using the distribution function or the density function, and for performing a first selection of a first value corresponding to the maximum value of the N distributed values, performing a second selection of a second value corresponding to one of the N distributed values associated with a first threshold value, calculating the difference between the first value and the second value and comparing the difference with a second threshold value.

According to one embodiment, if the difference is less than or equal to the second threshold value, the analysis means are configured for increasing the size of the memory area allocated to the integer portion and reducing the size of the memory area allocated to the fractional portion and if the difference is strictly greater than the second threshold value, the analysis means are configured for increasing the size of the memory area allocated to the fractional portion and for reducing the size of the memory area allocated to the integer portion.

According to another aspect, a microcontroller is also provided comprising said system as defined above.

Figure 1:
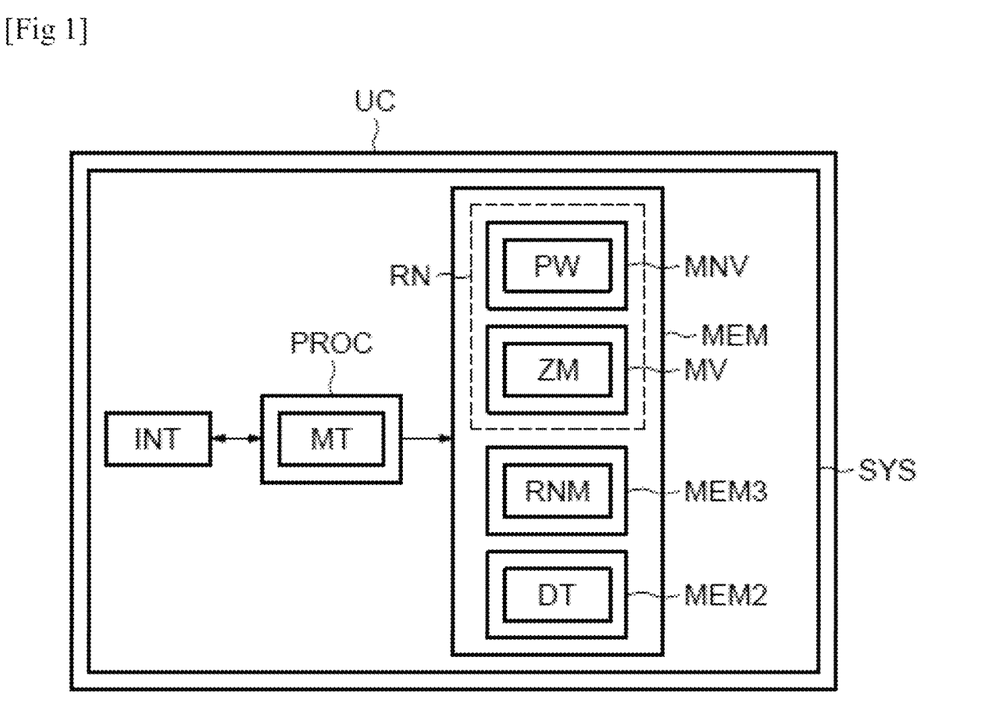
FIG. 1 schematically illustrates an embodiment of the invention.

In FIG. 1, the reference UC designates an electronic object, e.g. a microcontroller, a code generator or any other object capable of containing an embedded hardware or software architecture.

The object UC comprises a system SYS, e.g. a module configured for installing an initial neural network RN, and comprising a memory array MEM, a computing unit (here a processor) PROC and a user interface INT.

The memory array MEM is coupled to the processor PROC and comprises a non-volatile memory MNV, e.g. a ROM (Read-Only Memory). Said non-volatile memory is configured for storing the configuration of the neural network RN, e.g. the different layers characterizing it and its weights PW.

The memory array MEM also comprises a volatile memory MV, e.g. a RAM (Random Access Memory). The volatile memory MV comprises initial memory areas ZM intended to contain the output data of each layer of the initial neural network RN.

The weights PW and the size of the initial memory areas ZM represent a set of initial parameters of the neural network RN.

The memory array MEM also comprises a memory MEM3 configured for storing the data relating to a new set of parameters of a new neural network RNM representing the modified neural network RN.

The processor PROC is also configured for storing the new set of parameters of the neural network RNM instead of the set of initial parameters of the initial neural network RN.

The memory array MEM also comprises a memory MEM2, e.g. a non-volatile ROM memory configured for storing a test input data set DT.

The test input data set DT is configured for assessing the performance of the initial neural network RN or the performance of the modified neural network RNM.

The processor PROC also comprises analysis means MT, produced, for example, in software or hardware form, configured for performing an analysis of the set of initial parameters defining said neural network, reducing the size of at least one initial parameter, e.g. sizes of the initial memory areas ZM or the two initial parameters of the layers of said network RN and thus obtaining a new set of parameters defining the new neural network RNM.

By thus modifying the set of initial parameters of the neural network RN, a new set of parameters is obtained.

The new parameters thus reduced have their data represented in fixed point.

"Fixed point" is understood to mean a representation of a number with a fixed number of decimal places.

A fixed-point representation comprises an integer portion, i.e. bits to the left of the decimal point, and a fractional portion corresponding to the number of bits to the right of the decimal point.

This memory reduction allows the system implementing the neural network to be faster.

The analysis means MT are configured for applying said test input data set DT only once to each layer thereby increasing the processing speed of the new neural network RNM.

The analysis means MT are thereafter configured for generating a distribution or density function from the data resulting from the implementation of the test input data set and adjusting the size of the memory area allocated to the fractional and integer portion according to the data extracted from said function.

The resulting data may, for example, be discretized over 32 values to be stored. This avoids slowing down the development of the density or distribution function.

The processor PROC is coupled to the user interface INT configured for allowing the user to choose the number of values to be stored in memory MEM3.

This number may also be chosen by default.

The user interface INT is also configured for allowing the user to provide values for parameters involved in the decision relating to said adjustment.

These parameters are stored in a volatile memory, e.g. the memory MEM3.

Figure 2:
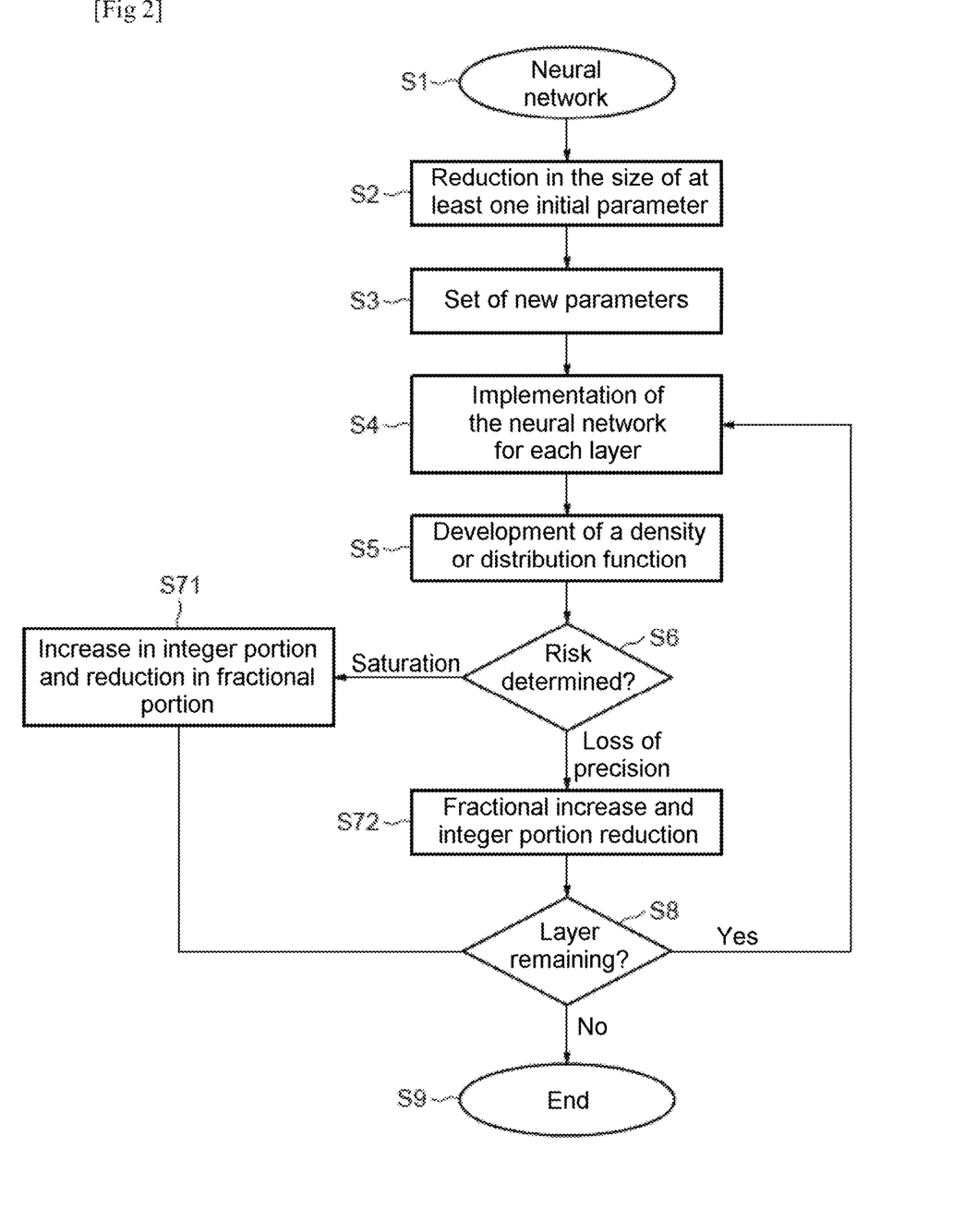
FIG. 2 schematically illustrates an implementation of the invention.

FIG. 2 represents an algorithm for analyzing the initial parameters data set defining the neural network RN.

In step S1, the processor PROC extracts the set of initial parameters of the neural network RN, e.g. the weights PW of all the layers or the sizes of the initial memory areas ZM of each layer or both parameters.

In step S2, the analysis means MT perform a reduction in the initial memory size of at least one initial parameter of the neural network RN, e.g. a reduction in the weights PW or the sizes of the initial memory areas ZM or else a reduction in the initial memory size of both parameters.

By way of example, if said initial memory size of said at least one parameter is 32 bits, the analysis means MT reduce the initial size by 24 bits. Said at least one parameter therefore has a new memory size of 8 bits.

A representation of said at least one parameter over 8 bits, for example, is a fixed-point representation.

Thus in step S3 a set of new parameters is obtained.

In step S4, the processor PROC implements the new neural network RNM by applying the test input data set DT to each layer of said new network.

The data resulting from the implementation of the test input data set DT makes it possible to develop for each layer a distribution or density function known to the person skilled in the art in step S5.

The development of the distribution or density function makes it possible in step S6 to determine whether the reduction in the size of said at least one parameter leads to a risk of saturation or loss of precision based on the data extracted from said function.

"Risk of saturation" is understood to mean that a majority of the data resulting from the implementation of the test input data set DT are large numbers. Therefore enough bits must be provided in the integer portion to be able to represent them.

"Risk of loss of precision" is understood to mean that a majority of the data resulting from the implementation of the test input data set DT are small numbers. Therefore enough bits must be provided in the fractional portion to be able to represent them and thus reduce the loss of precision.

In other words, the development of the distribution or density function makes it possible to determine how the adjustment should be done with respect to the size of the integer portion and the size of the fractional portion for finding a good compromise between the risks of saturation and loss of precision.

If there is a risk of saturation, the method proceeds to step S71 in which the analysis means MT increase the size of the memory area allocated to the integer portion and reduce the size of the memory area allocated to the fractional portion.

If there is a risk of loss of precision, the method proceeds to step S72 in which the analysis means MT increase the size of the area allocated to the fractional portion and reduce the size of the memory area allocated to the integer portion.

The analysis means MT then check whether there is a layer remaining to be processed in step S8.

If so, steps S4, S5, S6 and S71 or S72 are repeated in order to adjust the size of memory area allocated to the fractional portion and to the integer portion for said layer.

If there are no remaining layers, this means that said adjustment has been made for all the layers of the neural network RNM. The method therefore proceeds to step S9 marking the end of the execution of the algorithm.

Figure 3:
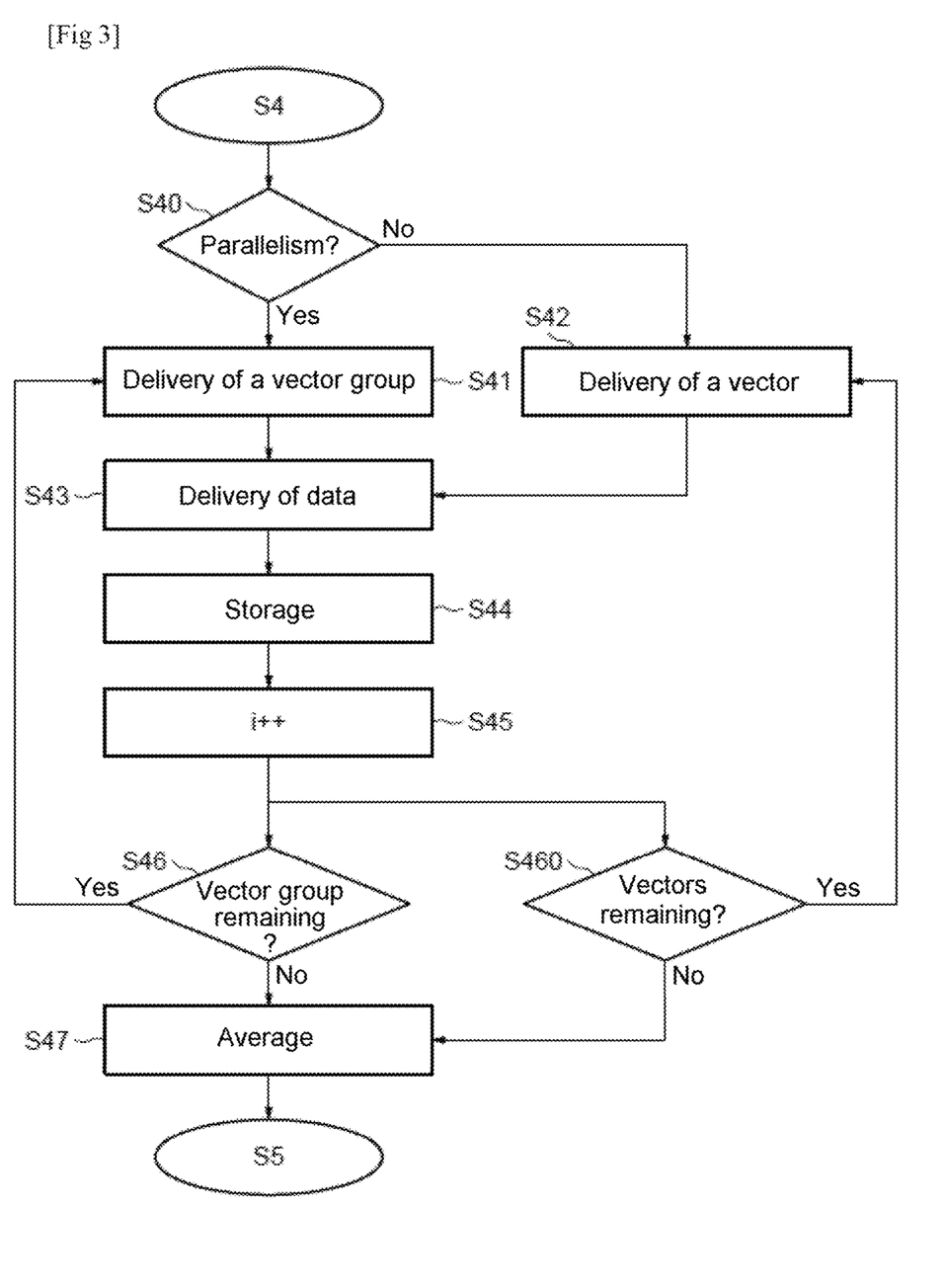
FIG. 3 schematically illustrates an implementation of the invention.

FIG. 3 represents the substeps of step S4 corresponding to the application of the test input data set DT to each layer of the neural network RNM.

The test input data set DT comprises a plurality of data vectors.

When the neural network RNM is executed in a graphics processor PROC or GPU (Graphics Processing Unit), it is advantageous to deliver for each layer a successive group of vectors to take advantage of the parallelism of said processor.

The analysis means MT accordingly check whether the processor PROC is a graphics processor in step S40. If so, the method proceeds to step S41 in which the analysis means MT deliver a first successive group of vectors of said test input data set DT.

The first vector group delivered for each layer in step S43 makes it possible to produce, after passing through the weights of the layer and the size thereof has been reduced, an output data matrix from the layer.

"Matrix" is understood to mean a sequence of output data the size of which has been reduced, e.g. a sequence of values 32, 16, 2.

Since the size of the memory area ZM is reduced, some values will not be correctly represented. This means that if at the output of the layer, the memory area allocated to the output data, the size of which has been reduced, contains a majority of large values, it may be that there is a risk of saturation on the largest values.

Otherwise, if at the output of the layer, the memory area allocated to the output data, the size of which has been reduced, contains a majority of small values, it may be that there is a risk of loss of precision on the smallest values.

In other words, given that the reduction in the size of the initial memory area ZM has a direct impact on the representation of the output data, it is advantageous to use these values in the development of a distribution or density function making it possible thereafter to perform said adjustment on the size of the memory area allocated to the output data which represents one of the new parameters of the new neural network RNM.

Hence, given that the values of the output data depend on the values of said weights which represent one of the new parameters of the new neural network RNM, the reduction in the size of the weights PW leads either to a saturation in the weights or to a loss of precision, which results in a delivery of output data with imprecise values.

It is therefore advantageous to also use the values of said weights in the development of a distribution or density function making it possible thereafter to perform said adjustment on the size of the weights for each layer.

For each layer, the output data of the matrix or the values of the weights are discretized over N values on the abscissa axis of the distribution or density function.

It is advantageous to store N values encompassing the discretized output data delivered by the layer or the N values of the weights or a combination of the two to avoid subsequently slowing down the various calculations related to the development of the density or distribution function. N may, for example, be equal to 32.

The user may set N via the user interface INT according to the complexity of their network and the available memory.

In step S44, the N values will be stored, for example, in the volatile memory MV.

Then, in step S45, an index i is incremented, corresponding to the number of groups of vectors in the test input data set DT and if, in step S46, any vector groups remain to be implemented for said layer, there is a return to step S41 for delivering the next group of vectors and accordingly repeating steps S43, S44, S45 and S46.

If in step S46, there are no more groups of vectors to be delivered to said layer, the method proceeds to step S47 where the analysis means MT calculate for each value among the N values stored in step S44, an average associated with each value.

This average corresponds to the probability density of each value in the set of N values.

The analysis means MT calculate N averages which therefore make it possible to plot the density or distribution function in step S5.

In the event that the processor PROC is not a graphics processor, the method proceeds from step S40 to step S42 in which the analysis means MT deliver vectors one by one to said layer. The next steps are the same as steps S43, S44, S45. On the other hand, after having incremented the index i, the method proceeds to step S460, in which the analysis means MT check whether any vectors remain to be implemented for said layer.

If so, the analysis means MT go back to step S42 to deliver the next vector. If not, the analysis means MT proceed to step S47.

Figure 4:
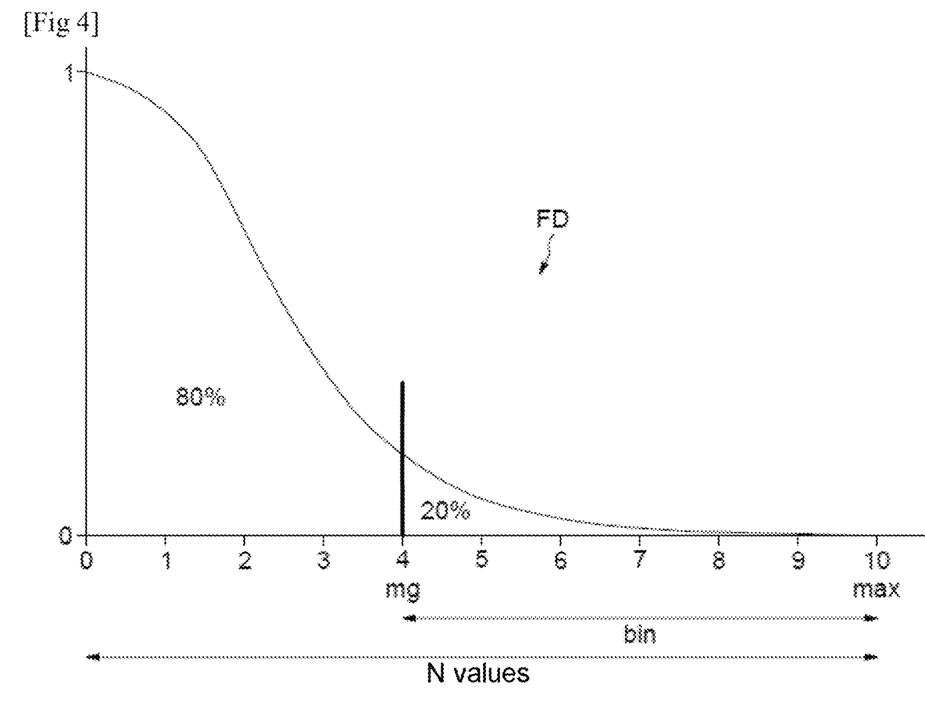
FIG. 4 schematically illustrates an implementation of the invention.
Figure 5:
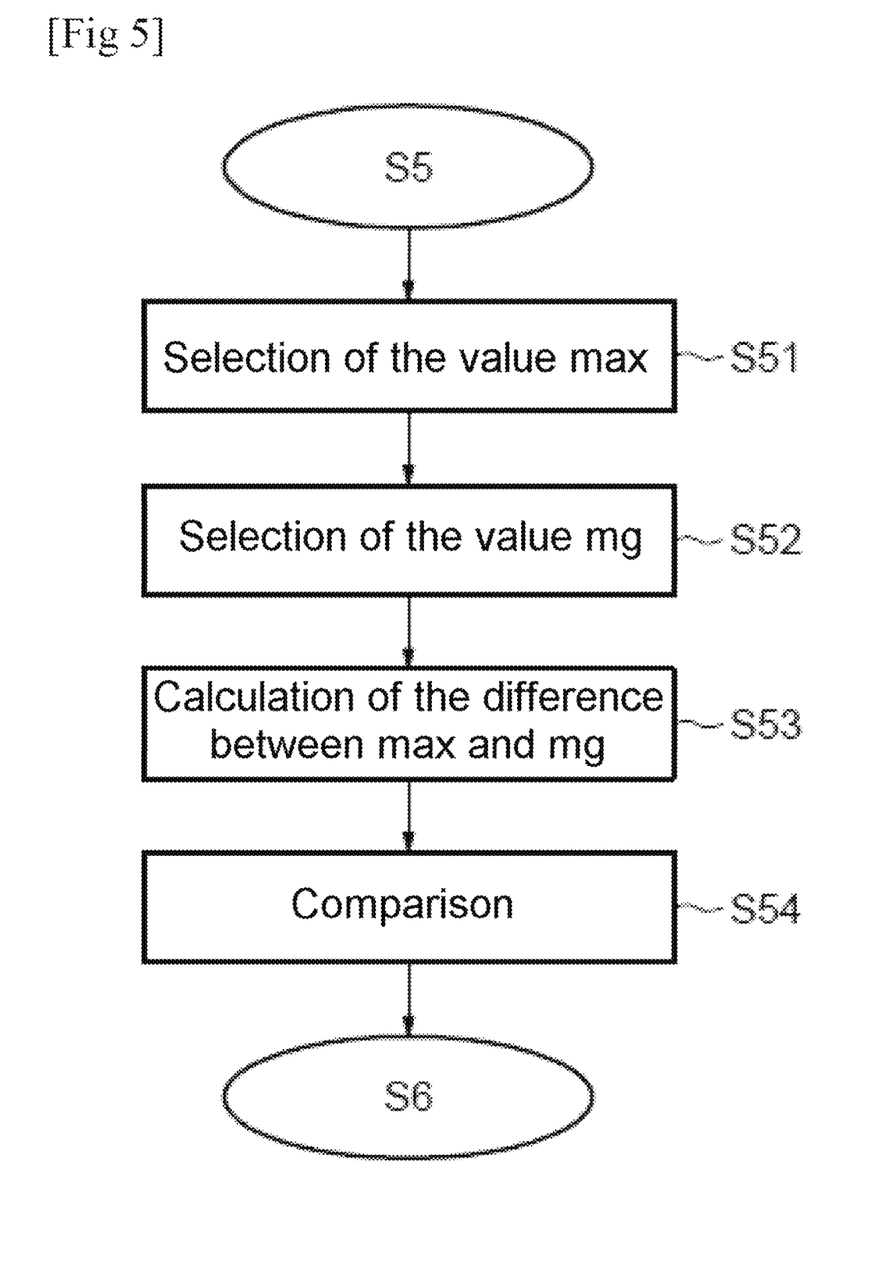
FIG. 5 schematically illustrates an implementation of the invention.

FIG. 4 illustrates a graph FD representing a distribution function developed by the analysis means MT and FIG. 5 represents the various substeps leading to the determination of the risk related to the reduction in the size of said at least one initial parameter.

On the abscissa axis, the N stored and averaged values are represented here ranging from 0 to 10.

Said N values may also be represented in the form of a power of 2 which advantageously makes it possible to perform arithmetic operations of the two's complement type.

On the ordinate axis, the values ranging from 0 to 1 represent cumulative probabilities.

In order to determine whether there is a risk of saturation or loss of precision as a result of the reduction in the memory size of said at least one parameter, the analysis means MT start by making a first selection in step S51 of a first value max corresponding to the maximum value of the N values distributed on the abscissa axis of said distribution function, here the value max being 10.

The analysis means MT then perform in step S52 a second selection of a second value mg corresponding to one of the N distributed values associated with a first threshold value, e.g. 0.2 or any threshold value making it possible to determine the area in which the density is significant.

For a better precision of the second value mg, the analysis means MT perform a linear interpolation.

The first threshold value may be chosen by the user via the interface INT and is used according to the following formula:

$cdf(N) >= 1$—the first threshold value in which:

cdf designates the distribution function according to the random variable N.

Here $cdf(N) >= 1-0.2$ and therefore $cdf(N) >= 0.8$ which means that on the abscissa axis, the value is selected from which there is a cumulative probability density of 80%.

The value mg associated with said first threshold value here is 4.

Thereafter, the analysis means MT calculate a difference bin in step S53 between the first value max and the second value mg, which here gives 10–4. The difference here is equal to 6.

The analysis means MT then perform a comparison in step S54 between the calculated difference bin i.e. 6 and a second threshold value that the user may also select via the interface INT.

The result of the comparison makes it possible to determine in step S6 whether there is a risk of saturation or loss of precision.

For example, if the second threshold value is equal to 3, the result of the difference bin being equal to 6, the result is therefore greater than the second threshold value. This means that there is a risk of loss of precision.

The analysis means MT accordingly perform said adjustment in step S72 described in FIG. 2, according to the formula:

$index = max - round(i + \tan h((K*bin - \text{second threshold value})/M))$ in which:

round is a function for rounding numbers to a specified precision level.

Tan h is a hyperbolic tangent. The tangent may be replaced by any increasing function between 0 and 1 which saturates.

K and M are adjustable parameters allowing better adjustment. K may, for example, be equal to 2 and M, for example, to 16.

The result of the calculation is the index value corresponding to the bit shift to be carried out, therefore a shift of the decimal point.

In other words, it is a matter of determining whether more bits should be assigned to the area allocated to the fractional portion or to the area allocated to the integer portion. Here, in the event of the risk of loss of precision, a shift of the decimal point to the left must be made.

In the event that the result of the difference bin is less than or equal to the second threshold value, the analysis means MT accordingly perform said adjustment in step S71 described in FIG. 2, according to the formula:

index=max+round(second threshold value−bin) in which:

The index value here also corresponds to the bit shift to be performed and therefore a shift of the decimal point i.e. to determine whether more bits should be assigned to the fractional portion or to the integer portion. Here, in the event of the risk of saturation, a shift of the decimal point to the right must be made.

Of course, all the steps described are also applicable to a density function.

What is claimed is:

1. A method comprising:
analyzing a set of initial parameters defining an initial multilayer neural network, the analyzing comprising reducing a size of at least one initial parameter of each layer of the initial multilayer neural network to obtain for each layer a set of new parameters defining a new neural network, each new parameter of the set of new parameters having its data represented in fixed point format having a fixed number of decimal places, with an integer portion corresponding to an integer number to a left of a decimal point, a fractional portion corresponding to a fractional number to a right of the decimal point, and a sign bit;
implementing the new neural network using a test input data set applied only once to each layer to generate an output data matrix for each layer;
determining a distribution function or a density function for each layer based on the output data matrix for each layer;
using the determined distribution function or density function to select, according to a compromise between a risk of saturation and a risk of loss of precision, either:
an increase in a size of a first memory area allocated to the fractional portion and a reduction in a size of a second memory area allocated to the integer portion of each new parameter associated with each layer, or
a reduction in the size of the first memory area allocated to the fractional portion and an increase in the size of the second memory area allocated to the integer portion of each new parameter associated with each layer; and
increasing the size of the first memory area allocated to the fractional portion and reducing the size of the second memory area allocated to the integer portion of each new parameter associated with each layer.

2. The method according to claim 1, wherein:
the test input data set comprises a plurality of data vectors; and
implementing the new neural network comprises:
delivering data vectors of the plurality of data vectors, the delivering the data vectors comprising delivering the data vectors one-by-one or delivering the data vectors according to successive groups of vectors; and
generating the output data matrix representative of the set of new parameters associated with each layer.

3. The method according to claim 2, wherein determining the distribution function or the density function comprises calculating a probability density of values of the new parameters associated with each layer obtained by implementing the new neural network for each layer.

4. The method according to claim 3, wherein determining the distribution function or the density function for each layer comprises distributing discretized possible values of the new parameters delivered by the layer over N values, calculating a probability density of each value among the N values, and storing each calculated probability density associated with each of the N values.

5. The method according to claim 4, wherein the N values are in a form of a power of 2.

6. The method according to claim 4, wherein determining the distribution function or the density function comprises selecting a first value corresponding to a maximum value of the N values, selecting a second value corresponding to one of the N values associated with a first threshold value, calculating a difference between the first value and the second value, and comparing the difference with a second threshold value.

7. The method according to claim 6, wherein the difference is greater than the second threshold value.

8. A system comprising:
a memory array;
a processor coupled to the memory array, the processor configured to:
analyze a set of initial parameters defining an initial multilayer neural network by reducing a size of at least one initial parameter of each layer of the initial multilayer neural network to obtain for each layer a set of new parameters defining a new neural network, wherein each new parameter of the set of new parameters has its data represented in fixed point format having a fixed number of decimal places, with an integer portion corresponding to an integer number to a left of a decimal point, a fractional portion corresponding to a fractional number to a right of the decimal point, and a sign bit;
implement the new neural network using a test input data set applied only once to each layer to generate an output data matrix for each layer;
determine a distribution function or a density function for each layer based on the output data matrix for each layer;
use the determined distribution function or density function to select, according to a compromise between a risk of saturation and a risk of loss of precision, either:
an increase in a size of a first memory area of the memory array allocated to the fractional portion and a reduction in a size of a second memory area of the memory array allocated to the integer portion of each new parameter associated with each layer, or
a reduction in the size of the first memory area of the memory array allocated to the fractional portion and an increase in the size of the second memory area of the memory array allocated to the integer portion of each new parameter associated with each layer; and
implement the selection.

9. The system according to claim 8, in which the test input data set comprises a plurality of data vectors, and the processor is configured to implement the new neural network by:
- delivering data vectors of the plurality of data vectors, wherein delivering the data vectors comprises delivering the data vectors one-by-one or delivering the data vectors according to successive groups of vectors; and
- generating the output data matrix representative of the set of new parameters associated with each layer.

10. The system according to claim 9, wherein the processor is configured to determine the distribution function or the density function by calculating a probability density of values of the new parameters associated with each layer obtained by implementing the new neural network for each layer.

11. The system according to claim 10, wherein the processor is further configured to determine the distribution function or the density function for each layer by distributing discretized possible values of the new parameters delivered by the layer over N values, calculating a probability density of each value among the N values, and storing each calculated probability density associated with each of the N values.

12. The system according to claim 11, in which the N values are in a form of a power of 2.

13. The system according to claim 11, wherein the processor is further configured to determine the distribution function or the density function by selecting a first value corresponding to a maximum value of the N values, selecting a second value corresponding to one of the N values associated with a first threshold value, calculating a difference between the first value and the second value, and comparing the difference with a second threshold value.

14. The system according to claim 13, wherein the processor is further configured to:
- in response to the difference being less than or equal to the second threshold value, increase the size of the second memory area allocated to the integer portion, and decrease the size of the first memory area of the memory array allocated to the fractional portion; and
- in response to the difference being greater than the second threshold value, increase the size of the first memory area of the memory array allocated to the fractional portion, and decrease the size of the second memory area allocated to the integer portion.

15. The system of claim 8, wherein the processor is a microcontroller.

16. The system of claim 8, wherein the processor is a graphics processor.

17. A method comprising:
- analyzing a set of initial parameters defining an initial multilayer neural network, the analyzing comprising reducing a size of at least one initial parameter of each layer of the initial multilayer neural network to obtain for each layer a set of new parameters defining a new neural network, each new parameter of the set of new parameters having its data represented in fixed point format having a fixed number of decimal places, with an integer portion corresponding to an integer number to a left of a decimal point, a fractional portion corresponding to a fractional number to a right of the decimal point, and a sign bit;
- implementing the new neural network using a test input data set applied only once to each layer to generate an output data matrix for each layer;
- determining a distribution function or a density function for each layer based on the output data matrix for each layer;
- using the determined distribution function or density function to select, according to a compromise between a risk of saturation and a risk of loss of precision, either:
  - an increase in a size of a first memory area allocated to the fractional portion and a reduction in a size of a second memory area allocated to the integer portion of each new parameter associated with each layer, or
  - a reduction in the size of the first memory area allocated to the fractional portion and an increase in the size of the second memory area allocated to the integer portion of each new parameter associated with each layer; and
- reducing the size of the first memory area allocated to the fractional portion and increasing the size of the second memory area allocated to the integer portion of each new parameter associated with each layer.

18. The method according to claim 17, wherein:
the test input data set comprises a plurality of data vectors; and
implementing the new neural network comprises:
- delivering data vectors of the plurality of data vectors, the delivering the data vectors comprising delivering the data vectors one-by-one or delivering the data vectors according to successive groups of vectors; and
- generating the output data matrix representative of the set of new parameters associated with each layer.

19. The method according to claim 18, wherein determining the distribution function or the density function comprises calculating a probability density of values of the new parameters associated with each layer obtained by implementing the new neural network for each layer.

20. The method according to claim 19, wherein determining the distribution function or the density function for each layer comprises distributing discretized possible values of the new parameters delivered by the layer over N values, calculating a probability density of each value among the N values, and storing each calculated probability density associated with each of the N values.

21. The method according to claim 20, wherein determining the distribution function or the density function comprises selecting a first value corresponding to a maximum value of the N values, selecting a second value corresponding to one of the N values associated with a first threshold value, calculating a difference between the first value and the second value, and comparing the difference with a second threshold value, the difference being less than or equal to the second threshold value.

* * * * *